Dec. 18, 1928.

E. A. SPERRY, JR

AUTOMATIC STEERING FOR DIRIGIBLE CRAFT

Original Filed April 9, 1923  6 Sheets-Sheet 1

1,695,615

Inventor
ELMER A. SPERRY, JR.
By his Attorney
Herbert H. Thompson

Dec. 18, 1928.
E. A. SPERRY, JR
1,695,615

AUTOMATIC STEERING FOR DIRIGIBLE CRAFT

Original Filed April 9, 1923    6 Sheets-Sheet 3

Inventor
ELMER A. SPERRY, JR.
By his Attorney
Herbert H. Thompson

Dec. 18, 1928.
1,695,615
E. A. SPERRY, JR
AUTOMATIC STEERING FOR DIRIGIBLE CRAFT
Original Filed April 9, 1923   6 Sheets-Sheet 4

Inventor
ELMER A. SPERRY, JR.
By his Attorney
Herbert H. Thompson

Dec. 18, 1928.

E. A. SPERRY, JR

1,695,615

AUTOMATIC STEERING FOR DIRIGIBLE CRAFT

Original Filed April 9, 1923  6 Sheets-Sheet 5

Inventor
Elmer A. Sperry, Jr.
By his Attorney
Herbert H. Thompson

Patented Dec. 18, 1928.

1,695,615

UNITED STATES PATENT OFFICE.

ELMER A. SPERRY, JR., OF BROOKLYN, NEW YORK, ASSIGNOR TO THE SPERRY GYROSCOPE COMPANY, OF BROOKLYN, NEW YORK, A CORPORATION OF NEW YORK.

AUTOMATIC STEERING FOR DIRIGIBLE CRAFT.

Application filed April 9, 1923, Serial No. 630,853. Renewed December 5, 1927.

This invention relates to automatic steering devices for dirigible craft such as vessels, torpedoes and aeroplanes which are guided by a rudder, and relates more particularly to automatic steering devices controlled from a direction indicator, especially a gyroscopic compass. The principal object of the invention is the provision of a device of this type which is simple in construction, efficient and reliable in operation, rugged and not easily put out of order, and practical for the steering of small or large craft.

As is well known, pitching of a ship does not of itself produce rotation thereof in azimuth; neither does rolling of the ship affect such rotation, but a combined pitching and rolling will result in a certain amount of turning of the ship in azimuth, and hence turning of the course indicator. Such turning may be termed "false or weather yaw" as distinguished from the normal, usual yawing motion of a vessel due to its propeller and rudder action. Such false yaw is likely to be present in bad weather and would ordinarily result in violent and frequent operation of the steering device, which is dependent upon the course indicator, to counteract these apparent deviations of the vessel from its course. It is a further object of this invention to provide an adjustment, hereinafter termed the weather adjustment, whereby the effect of false yaw upon the automatic steering device may be eliminated:

Further, this invention has for its object the provision of means for assisting in checking the turning movements of a craft, that is, reducing the real yaw of the ship to a minimum. For this purpose there is provided means for giving the rudder a predetermined amount of overthrow in the proper direction for stopping the craft sooner than would otherwise be the case. This is preferably accomplished by some type of delayed-action or lost-motion means which causes a relatively large initial throw of the rudder when the direction of yaw of the ship changes.

Further, this invention has for its object the provision of simple, effective means whereby a new course may be quickly set, the automatic steering device operating immediately to direct the craft into the new course.

It is a further object of this invention to provide a steering device capable of being adjusted to render it applicable to ships of various sizes and characteristics, and suitable for the same ship under different conditions, such as, when loaded or unloaded. To accomplish this purpose I provide adjustable means whereby the rudder may be operated through a variable angle for any given deviation of the ship.

A further object is the provision of automatic means for rendering the rudder-actuating means ineffective when the rudder has been actuated to either side through a predetermined angle.

Other objects and advantages will be in part obvious and in part specifically referred to in the specification.

Referring to the drawings wherein I have shown what I now consider to be a preferred form of my invention.

Referring to the drawings, there is shown a pilot-wheel 10 for controlling the usual steering-engines by hand, and the automatic steering device or controller 11 whereby the steering engines may be operated automatically. The controller 11 is preferably a multi-part controller, that is, its action or relative position of its parts is governed by more than one variable. First, it is, of course, primarily responsive to changes in the ship's heading, or in other words, to changes in reading of the gyro compass. For satisfactory operation, however, I prefer to introduce into the controller one or more other variables, these preferably being a follow-up device from the rudder and a hand-setting device whereby the course of the ship may be changed. These three variables may, of course, be introduced into the controller through any form of differential connection by which each one may be introduced without interfering with the other. The controller 11 is operatively connected by a chain and sprocket drive 13, 14 to the driving shaft 15 which actuates the usual telemotor mechanism for operating the steering engines. The controller portion of said mechanism usually consists of a pair of cylinders and pistons (not shown) located in the stand 300, the pistons of which are respectively connected to rack bars 301 and 302 meshing with the pinion of the shaft 15 of the pilot wheel 10. The pipes 303 and 304 connect the forward portion of the mechanism to the telemotor proper 305 (Fig. 15) usually located at the after end adjacent the rudder. The sprocket wheel 14 is fixed to a shaft 17 supported in bearings 18, 19 formed in the casing 20 of the controller and in a bracket 30 formed on said casing, respectively.

For operating the telemotor there may be provided a motor 25 supported within casing 20 and having a pinion 26 at one end of its shaft, said pinion meshing with a gear 27 loosely mounted upon a collar 29 fixed to the bracket 30 and surrounding shaft 17. Said gear may be caused to rotate with shaft 17 so that the steering engines may be operated by the motor 25, or it may be disconnected therefrom to permit hand operation of the steering engines through the pilot-wheel. For this purpose a clutch 32 is splined upon shaft 17 and is provided with pins 31 engageable in holes in the gear 27 to cause it to move with the shaft 17. For sliding the clutch 32 into or out of engagement with gear 27 there may be provided a clutch handle 33 pivoted on the casing 20 at 34 so that one end thereof projects outside of the casing and the other end engages in a circumferential groove 35 formed on member 32. The clutch may thus be operated by the hand or foot to render the automatic steering mechanism effective or ineffective. For rendering the pilot wheel ineffective when the automatic steering control is operating, the pilot wheel may be detachably connected to shaft 15 by a clutch 40.

It is thus apparent that whether the steering engines are operated by hand through the pilot-wheel or automatically through the motor, the shaft 17 will be rotated in either case.

Figures 5, 6, 7, 8:
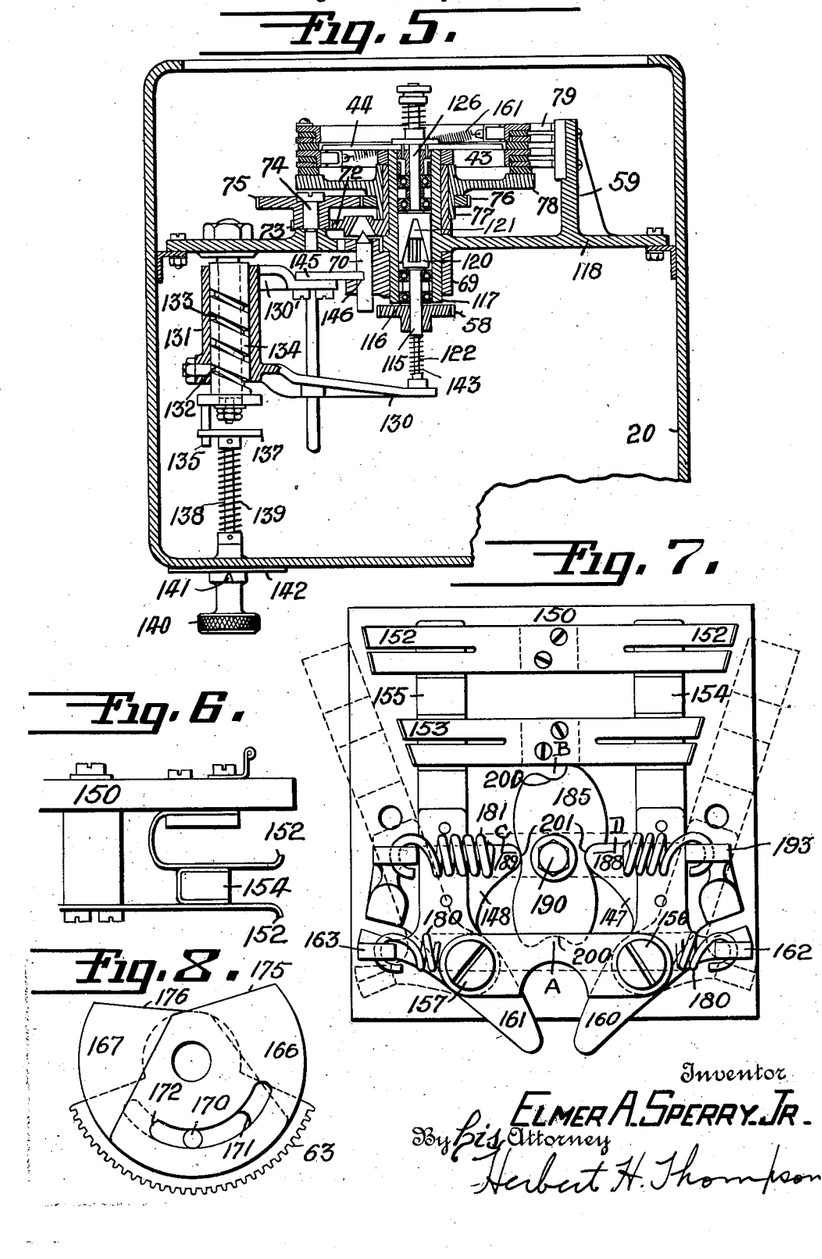
Fig. 5 is a substantially horizontal section through the motor-controlling unit of Fig. 3, showing the unit mounted within the casing of the steering device.
Fig. 6 is a plan view of a portion of a motor-controlling switch shown in detail in Fig. 7.
Fig. 7 is a front elevation of the motor-controlling switch.
Fig. 8 is a rear elevation of means for limiting the movements of the rudder.

To render the motor effective to operate the steering engines when a vessel moves off a predetermined course, assuming the clutch has been set for automatic steering, there is provided a circuit-closer comprising a pair of substantially semi-circular segments or upper contact members 41, 42 and lower contact segments 43 (see Fig. 5). A trolley 44, having poles 45 and 46 on different levels to cooperate with the segments 41, 42 and segments 43, is controlled from the compass. The segments 41, 42 are separated by insulator strips 47, the segments on opposite sides of the strips being in different motor circuits. The current enters through ring 43, passes through the hole 46 to pole 45 and thence to segment 41 or 42 to energize the motor in one direction or the other. If pole 45 is positioned on the insulator strip 47 the motor is not energized. The lower ring 43 may also be split so that when pole 46 is positioned on one portion thereof an alarm circuit 150' is closed (see Fig. 13); said portion is suitably positioned so that engagement of pole 46 therewith will take place only when the ship has veered off its course to a dangerous extent, without an attendant motor corrective of the rudder.

The trolley and contacts are so arranged relatively to each other that when the vessel is traveling on its course the trolley is positioned on the insulator strips and the motor 25 is not operated. As soon as the ship departs from its course, the trolley, which is controlled from the compass, will engage one or the other set of contact-members, depending upon the direction of departure, to actuate a switch 49 and operate the motor. The circuits between the contact segments and the motor are such that the motor will be operated in a direction to position the rudder to return the vessel to its course. As the motor operates, shaft 17 is rotated, and connected to said shaft is a train of gearing for rotating the contact segments in the same direction as the trolley was rotated by the compass, thus constituting in effect a follow-up from the rudder. When the contact-members have been rotated through the same angle as the trolley, the latter will again rest upon the insulator strips to break the circuit through the motor 25. The rudder is thrown outwardly just as soon as the trolley moves off the insulator strips and quickly stops the ship in its deviating movement. Since the follow-up operates for a longer period of time the greater the departure of the vessel from its course, it follows necessarily that the rudder is operated through an angle proportional to said departure. The rudder remains positioned outwardly and will serve to swing the ship back to its original position. As the vessel starts back, the trolley moves off the insulator strips in the opposite direction and the direction of rotation of the motor is reversed to throw the rudder to the opposite side. These operations are continued as long as there is any departure of the vessel from its course. There is thus a continual restoring process which consists in throwing out the rudder a distance proportional to the deviation to bring the vessel to a stop in its deviating movement, and then throwing it in the opposite direction as the vessel returns to its course to stop the craft at or close to its course. As long as the vessel is not on its course, the contact segments and trolley will be effective to cause operation of the rudder to such position as to swing the vessel toward its course.

Figure 3:
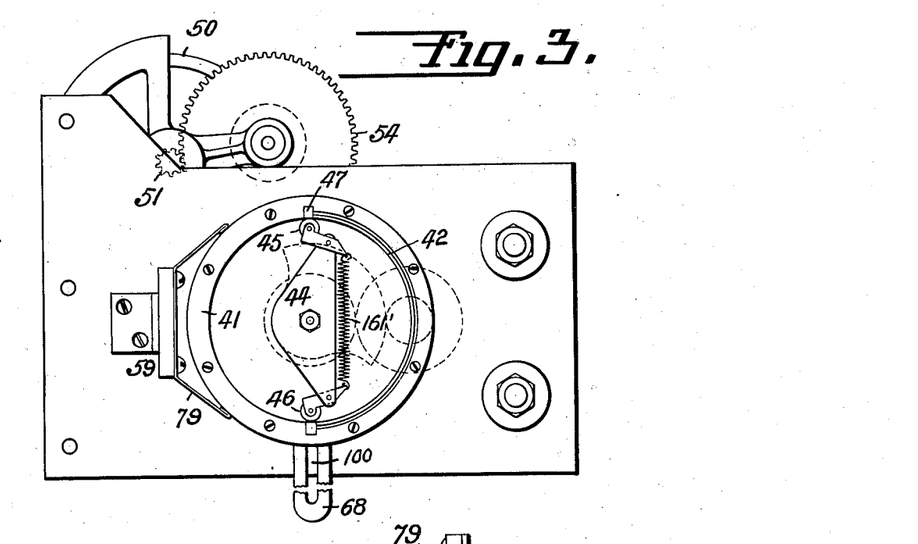
Fig. 3 is a rear elevation showing the motor-controlling unit.
Figure 4:
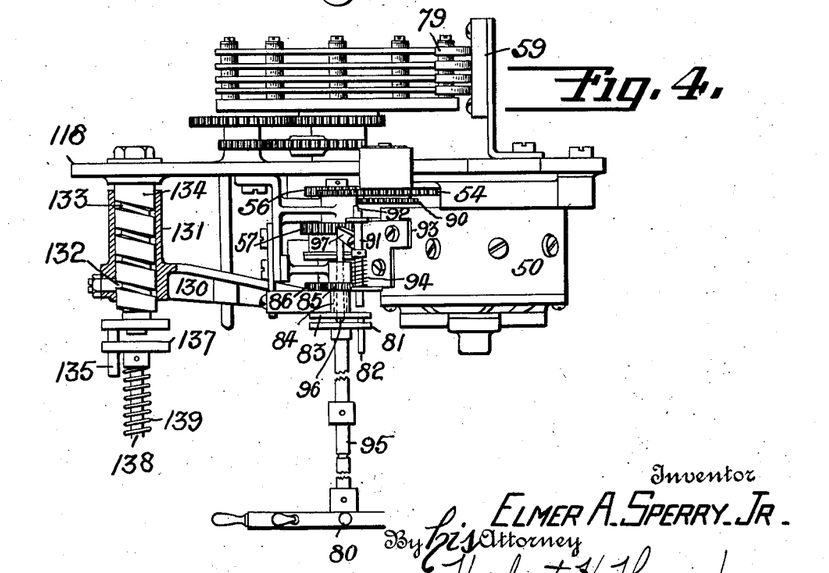
Fig. 4 is a plan view, partly sectional, of the unit shown in Fig. 3.

The connections between the compass and the trolley and the follow-up from the motor 25 to the contact segments will now be described. The movements of the compass are transmitted through a transmitter 50' to a repeater motor 50 operatively connected thereto. To the shaft of the repeater motor is fixed a pinion 51 (see Fig. 3) meshing with a gear 54 which engages a gear 56 of a differential and works down to the final gear 57 of said differential. The final gear 57 meshes with a gear 58 fixed to a shaft 115 (see Fig. 5) which is connected to the trolley 44 through a lost-motion connection 60 whose function will be hereinafter described. It is apparent that any movement of the compass (which is preferably a gyroscopic compass, or a repeater compass controlled thereby) will result in a proportional movement of the trolley.

The follow-up from the motor 25 to the contact segments comprises the pinion 22 on the inner end of shaft 17 meshing with a gear train 61, 62 supported on the casing 20 to actuate a gear 63 mounted upon a shaft 64 carrying at its end a bracket 65 supporting a slide 66 having a pin 67 engaging a link 68. The elements designated by the numerals 64 to 68 form part of the rudder adjustment to be hereinafter described. Said link 68 is connected to a collar 69 upon a hub 117 depending from a supporting or partition plate 118 within casing 20. The collar 69 rotates a segmental gear 72 through a lost-motion connection 70, 71, the function of which will be described hereinafter. Gear 72 meshes with gear 73 on shaft 74 supported in plate 118, said shaft carrying also gear 75 meshing with a gear 76 fixed to the hub 77 of a plate 78 upon which the contact segments are mounted. The current for the segments is supplied through brushes 79 carried by a bracket 59 fixed to the plate. When, therefore, a ship moves off its course, the trolley will be rotated, through the connections hereinbefore described, into engagement with segment 41 or 42, whereupon the motor 25 will be energized to operate the rudder in a direction to return the vessel to its course. At the same time the motor will rotate the contact segments, by the mechanism hereinbefore described, until they catch up with the trolley, whereupon the circuit through the motor is broken.

It is obvious from the foregoing description that the relative positions of the contact segments and the trolley determine the course, so that if the contact segments remained in the same position and the trolley was moved until it engaged one or the other set of contacts the rudder would be actuated to turn the ship and the follow-up mechanism would actuate the contact segments until the trolley was again positioned on the insulator strips. The ship would then be heading on a new course. The rotation of the trolley therefore offers a means for changing the course of the vessel. To rotate the trolley there may be provided a handle 80 carrying a plate 81 at its inner end provided with a slot through which extends a pin 82 on a plate 83 attached to one end of a shaft 84. To said shaft 84 is fixed a gear 85 meshing with a gear 86 of the differential to operate the final gear 57 thereof and thence, through the gearing hereinbefore described, rotate the trolley 44. The direction of rotation of the top of the handle determines the direction in which the ship's bow will turn. The repeater compass mounted on the casing 20 shows the course to the operator and guides the latter when setting a new course.

Figure 9:
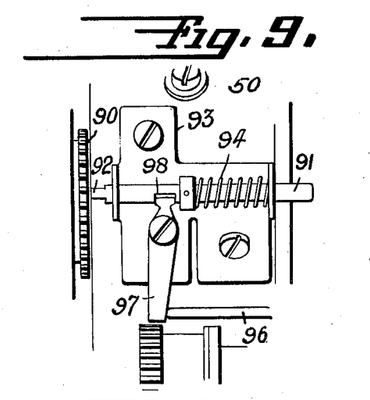
Fig. 9 is an enlarged side view of a compass-repeater locking means shown in Fig. 2.

In setting a new course through the lower gear 86 of the differential two methods may be pursued. First, if a large change of course is desired or if the quartermaster desires to steer without interference from the compass, it is desirable to prevent movement due to the repeater motor operating through the upper gear 56, for, if the repeater motor were also free to actuate the trolley at the same time as the handle, the turning of the ship into its new course would cause operation of said differential in a reverse direction to hinder the rapid setting of a new course and also prevent the rudder being held to one side of its central position. The repeater motor is therefore automatically locked against movement under these conditions. For this purpose there is provided a ratchet 90 fixed upon the same shaft as the gear 54 operated from the repeater motor. A rod 91 having a pawl 92 at its inner end is slidably mounted in a bracket 93 fixed to the repeater motor and is normally spring-pressed inwardly by a spring 94 tending to move the pawl into engagement with the ratchet-wheel 90 to lock the repeater motor. The shaft 95 is slidable in the controller casing and is normally pressed inwardly so that plate 81 presses inwardly a pin 96 operating through shaft 84, said pin engaging at its other end one end of lever 97 (see Fig. 9), the other end of which engages a notch 98 in rod 91 to move said rod against the action of spring 94 away from ratchet-wheel 90. When handle 80 is pushed inwardly, therefore, the repeater motor is free to operate the differential. When hand steering is desired, however, the handle 80 is pulled outwardly, allowing spring 94 to move pawl 92 into engagement with ratchet 90 and lock the repeater motor against movement. The second method of changing the course is by leaving the handwheel 80 pushed outwardly and by turning or adjusting it in this position. This, of course, will alter the position of trolleys 45—46 through the differential gearing described and result in setting a new course.

Figure 11:
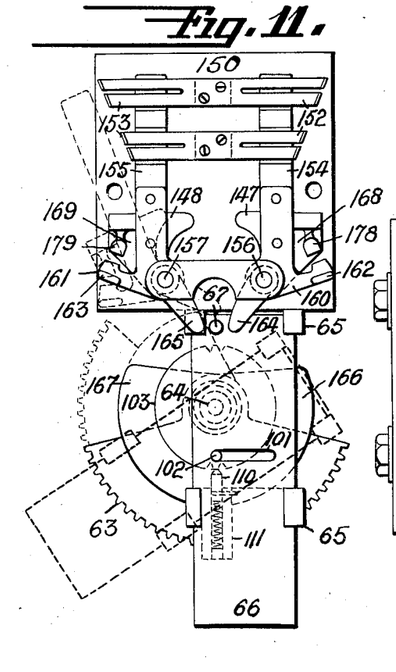
Fig. 11 is an assembled view of the devices shown in Figs. 7 and 8.

It is well-known that ships of various sizes and characteristics, as well as the same ship when loaded and unloaded, require different throws of the rudder to turn the ship through the same angle in a given time also that the maximum rudder angle varies with different ships. To permit adjusting the amount of throw of the rudder for a given angle of deviation of the ship, this invention provides a variable linkage in the follow-up between motor 25 and the contact segments, whereby the latter are moved more or less rapidly in catching up with the trolley to cause smaller or larger throw of the rudder for a given deflection between the trolley and segments. For this purpose, link 68 which, as hereinbefore described, is operatively connected to the contact segments, is provided with a slot 100 lengthwise therein (see Fig. 3) in which operates the pin 67. Obviously, by varying the position of pin 67 in slot 100, the amount of leverage on link 68 will be varied to move the contact segments more or less rapidly. For this purpose pin 67 is carried by the plate 66 slidable vertically in bracket 65 carried by shaft 64. Said plate 66 is provided with a lateral slot 101 (see Fig. 11) in which operates a pin 102 carried by a star-wheel 103 fixed to the inner end of a shaft 64 extending to the outside of casing 20 where it is fitted with a knob 105. The latter may be provided with calibrations cooperating with an index 106. The serrated edges of wheel 103 cooperate with a spring-pressed detent 110 slidable in a bearing-block 111 carried by bracket 65. By rotating the star-wheel by handle 105, pin 102 raises or lowers plate 66 and pin 67 to increase or decrease the effective leverage of link 68. When motor 25 operates through gear 63 to rotate shaft 64, the entire linkage comprising bracket 65, star-wheel 103, plate 66, and link 68 will move integrally. This or equivalent adjustment also permits means for securing the maximum sensitivity of control within the rudder angle available.

Figure 10:
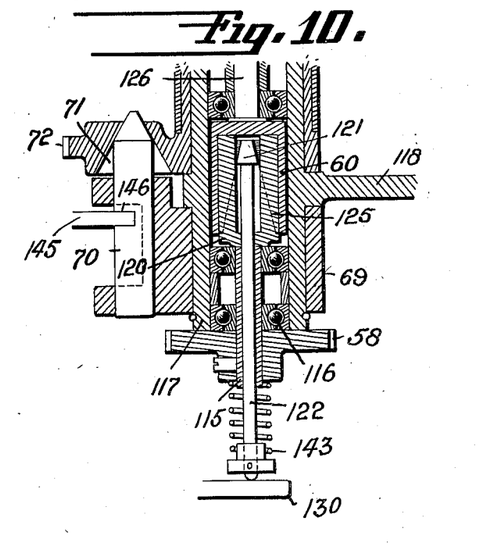
Fig. 10 is an enlargement of the telemotor and weather lost-motion devices shown in Fig. 5.

The false yaw hereinbefore mentioned which is usually present in rough weather and which is due to the combined pitching and rolling of the ship can be eliminated from the control devices so that such movements will not cause needless operation of the automatic steering mechanism. This function is accomplished by a weather adjustment comprising a lost-motion connection or other delayed-action device between the repeater motor and the trolley so that azimuth indications due to such false yaw will not be transmitted to the trolley, the actuation of the controller being rendered ineffective during a portion of the ship's turning movement. For this purpose gear 58 (see Fig. 5) which is driven from the final gear of the differential, is fixed to the shaft 115 rotating in anti-friction bearings 116 in the hub 117 depending from partition 118 upon which the contacts and trolley are mounted. Said shaft 115 is provided with a forked upper end 120 (see Fig. 10) between the prongs of which is positioned a cross-bar 121 fixed at the upper end of a rod 122 extending through shaft 115, so that rotation of gear 58 will also rotate bar 121. Said bar is wedge-shaped vertically and extends through wedge-shaped slots 125 of member 60. To the upper end of member 60 is fixed a shaft 126 to the upper end of which is fixed the trolley. The slots 125 (in Fig. 10) diverge downwardly, so that the lower the bar is positioned therein, the further the latter will have to travel before it contacts with one side or the other of slot 125 before rotating member 60 and the trolley. That is, the vertical movement (in Fig. 10) of rod 122 will determine the amount of lost-motion between the bar 121 (and hence gear 58) and the member 60 (and hence the trolley). As shown in Figs. 5 and 10, the bar 121 is positioned snugly in the vertex of slots 125, so that shaft 122 will move integrally with member 60 and the trolley. If the bar is moved away from the vertex of slots 125 there will be provided a degree of lost-motion depending upon the distance of said bar from said vertex. For moving said bar toward or away from the vertex of slots 125 the rod 122 may be connected at its outer end to an arm 130 formed integral with a sleeve 131 having a projection 132 on its inner surface extending into a spiral groove 133 in a shaft 134. Rotation of said shaft will cause linear movement of sleeve 131, arm 130, and hence rod 122 to vary the degree of lost-motion. For rotating shaft 134 it is provided in its outer end with a pin engaging in a slot in plate 137 at the inner end of a shaft 138 extending through the casing and provided with a knob 140. The pin and slot connection obviates the necessity for accurate alignment of the axes of shafts 138 and 134. A spring 139 surrounds shafts 138 and presses against plate 137 and the casing to provide the necessary friction to maintain the parts in set position. Knob 140 may be provided with an index 141 cooperating with a scale 142 fixed upon the casing. A spring 143 surrounding rod 122 tends normally to press the bar 121 out of the narrow portion of the slots 125.

Figure 12:
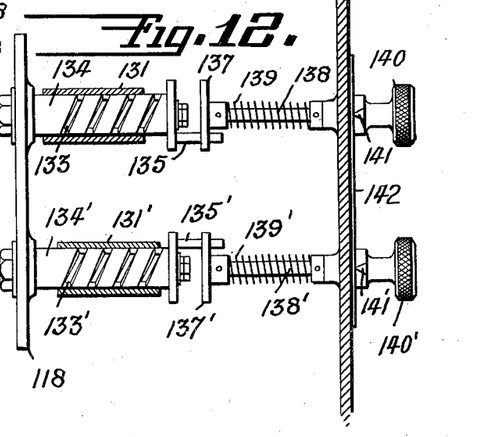
Fig. 12 is a side elevation showing the relative positioning of the weather and telemotor adjusting devices.

In order to effect rapid checking of the ship the rudder is given a certain amount of overthrow, that is, for the initial adjustment of rudder when the ship deviates or when it reverses its direction of yaw, I give the rudder a much greater throw than for relative further deviation in the same direction. This is accomplished by permitting the motor to rotate the rudder in the proper direction for a certain period of time before the follow-up mechanism becomes operative to rotate the contact segments. For this purpose the lost-motion 70, 71 is provided between collar 69 and gear 72 controlling the movement from the motor 25 to the contact segments so that the action of the follow-up portion of the controller is rendered ineffective during a portion of the rudder movement. The pin 70 has a conical tip cooperating with a conical opening 71 so that the further pin 70 is moved into said opening, the less will be the amount of lost-motion. Pin 70 is moved into or out of said opening by an arcuate plate 145 operating in a groove 146 in pin 70, the arcuate form of the plate permitting rotation of pin 70 along with collar 69. Plate 145 is carried by an arm 130' fixed to a sleeve 131' operated by mechanism similar to that designated by numerals 134 to 141, similar numerals being used with the prime designation. Fig. 12 shows the relative positioning of the two similar adjustments. Knob 140 may be labeled "Weather adjustment", knob 140' "Telemotor adjustment", and knob 105 "Rudder adjustment". This lost motion device accomplishes in an extremely simple and effective manner the "meeting" action or yaw suppressing effect which it was the aim of the prior patent to Elmer A. Sperry, No. 1,360,694, dated November 30, 1920 for navigational apparatus to accomplish by somewhat different means, since as soon as the ship starts to swing back toward its course, the rudder is thrown back to or beyond its central position owing to the presence of the lost motion in the follow-up system. It also gives a large throw of the rudder the instant deviation occurs.

The telemotor adjustment accomplishes another function in addition to obtaining an overthrow of the rudder, i. e., compensating for error in lost-motion in the telemotor. Without the telemotor adjustment, an error such as leakage or slippage in the telemotor would result in an insufficient throw (under throw) of the rudder for the given deviation. By the telemotor adjustment, the telemotor may be given sufficient additional operating time for any given deviation, not only to correct for errors in the telemotor, but to overthrow the rudder.

To prevent throw of the rudder beyond certain predetermined limits of safety, means are provided for breaking the circuit through the motor 25 when said limits are reached. For this purpose there is inserted in the motor circuit a switch 150 mounted within the casing 20. Said switch is of the double-knife type and comprises two sets of spring contacts 152, 153 (see Fig. 11) with which cooperate blades 154, 155, respectively, pivoted at 156, 157, respectively. The blades are each provided with an outwardly-extending arm 160, 161, each arm being provided with an ear 162, 163, respectively. Also pivoted at 156 and 157, respectively, are levers 147, 148, each having an arm 164, 165 extending downwardly into the path of cams 166, 167, respectively, loosely mounted on shaft 64 and connected to gear 63 by a bolt 170 extending through gear 63 and through concentric slots 171 and 172 in the cams to be driven by motor 25. When the latter has rotated shaft 64 and the cams in one direction or the other through a predetermined angle, the respective cam 166 or 167 will engage projection 164 or 165 to rotate the respective lever 147, 148 so that the other arm thereof 168, 169 is swung downwardly. Said arms 168, 169 are each provided with an ear 178, 179 which engages ear 162 or 163 to swing the respective blade 154 or 155 out of engagement with its contacts. The circuit is so arranged that disengagement of either blade with its spring contacts will break the motor circuit. The degree of rotation of shaft 64 which will cause breaking of the motor circuit may be varied by varying the positions of the cams (see Fig. 8) by loosening the bolt 170 and rotating the cams on said shaft to move the effective faces 175, 176 nearer to or further from the projections 164, 165.

The blades are normally rotated to a position to close the switch by means of a spiral spring 180 engaging the ears 162 and 163 slightly above the pivots 156 and 157. The levers 147 and 148 are also rotated normally to engage the blades by a spring 181 engaging projections 193, 194 on arms 168 and 169 of said levers (see Fig. 7).

Figure 1:
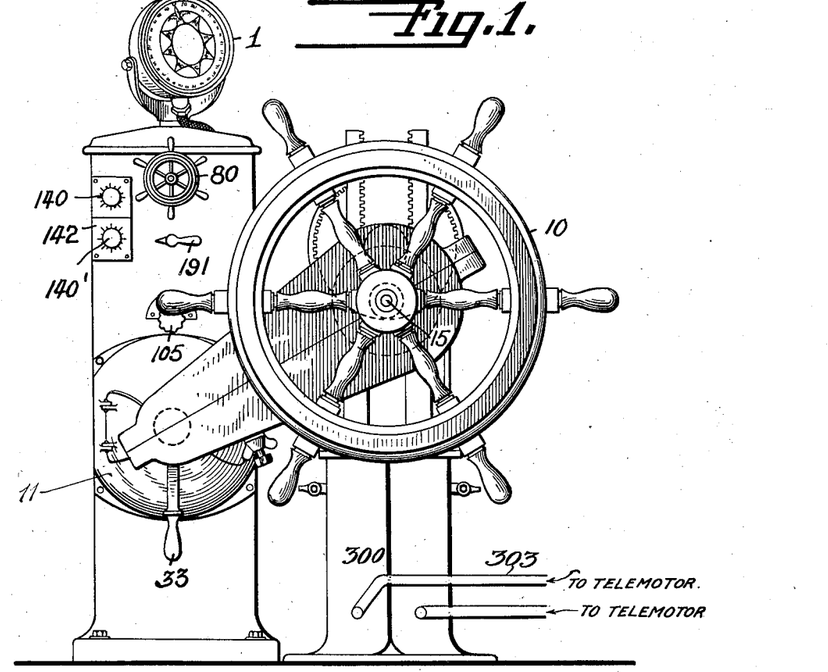
Fig. 1 is a front elevation of an automatic steering device embodying my invention, showing the connection of said device to the telemotor.
Figure 2:
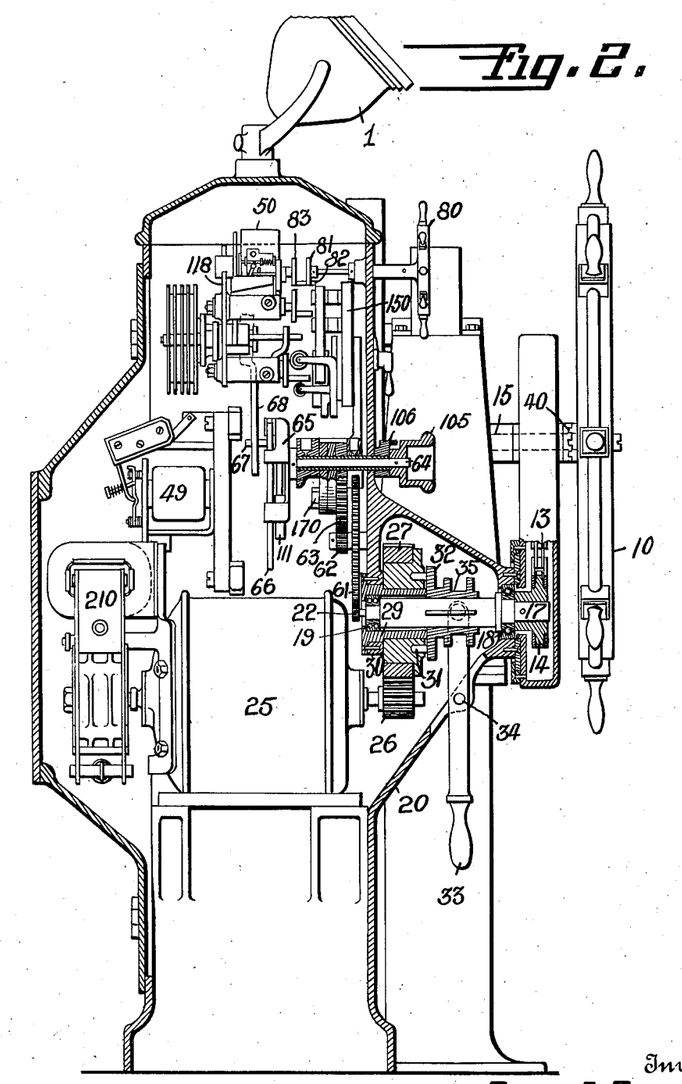
Fig. 2 is a side, vertical section through the Fig. 1 device.

For controlling the switch to render the motor effective or ineffective there may be provided a double cam 185 having cam surfaces engageable with projections 188, 189, on the levers 147, 148. The cam is of greater length along an axis A B than along an axis C D at substantially right angles thereto, so that when projections 188, 189 engage the cam adjacent axis C D the switch is closed, but when the cam is rotated until the projections engage axis A B the levers 147 and 148 are spread, which brings lugs 147'—148' thereof into engagement with lugs 154'—155' on the plates. Said blades are hence spread apart and the circuit through the motor is broken. Grooves 200 and 201 may be provided at the ends of axes A B and C D, respectively, in which the projections 188, 189 lodge. For rotating cam 185 the latter may be mounted upon a shaft 190 extending through casing 20 and having an operating handle 191 (see Fig. 1) fixed thereto. On the return movement of levers 147 and 148, lugs 193, 194 strike the blades and rotate them back into contact with the spring contacts.

Figure 13:
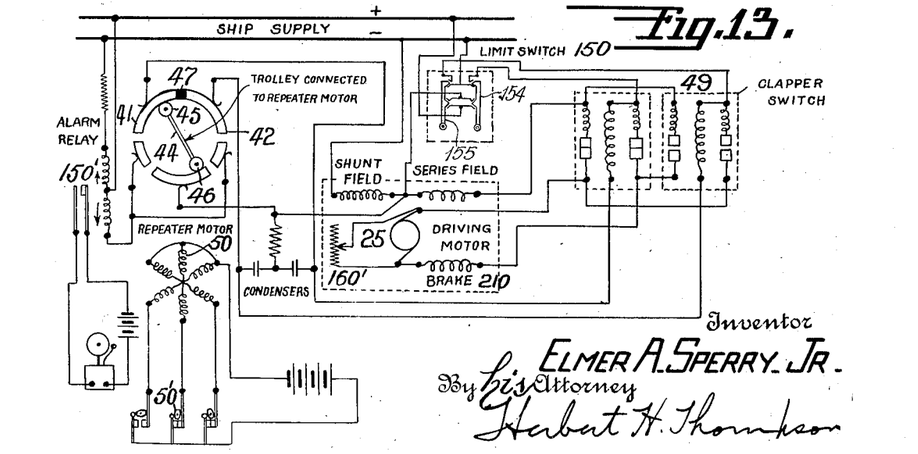
Fig. 13 is a wiring diagram.
Figure 15:
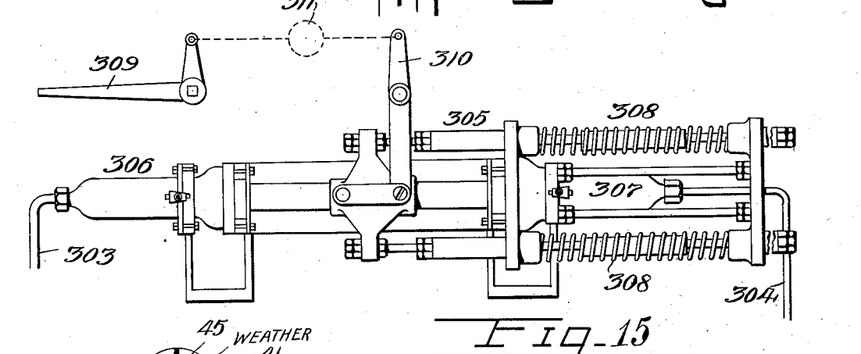
Fig. 15 is a view showing a conventional form of telemotor with rudder connections.
Figure 16:
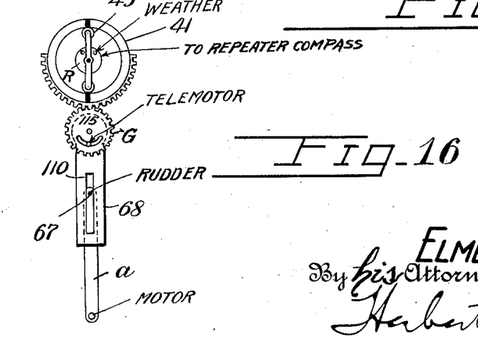
Fig. 16 is a diagram showing the interconnections between the weather, telemotor and rudder adjustments or lost motion devices, showing how the three features coordinate in the apparatus.

To obtain quick stoppage of the motor 25 and thus facilitate reversal, there may be provided a brake 210 coacting with the armature shaft and included in the motor circuit in the usual manner, (see Fig. 13). The brake serves also to hold the telemotor 305 in operated position. The telemotor usually comprises a plurality of pistons 306 and 307 or other operating members normally held in centralized position by a pair of heavy springs 308 and 309. The telemotor is shown in Fig. 15 as operating the rudder 309 through a lever 310 and some form of steering engine, the valve of which is represented diagrammatically at 311. The motor actuates the telemotor against the action of said centralizing springs and, if no brake were applied when the motor ceased operating, the springs would tend to restore the operating members to centralized position. The brake, becoming effective as soon as the motor stops, prevents such action and maintains the parts in operated position.

A further object of the brake is to supply the necessary friction in the follow-up system to brake the momentum of the latter. The movement of the contactor rings after the follow-up system has been brought to a stop may be prevented by causing the poles 45, 46 to press against the contactor rings with the necessary amount of friction. For this purpose the poles 45, 46 may be pivotally mounted in the ends of trolley arm 44 and swung into frictional engagement with the contactor rings by a spring 161' fastened to the other end of said poles. The spring 161' may be of any suitable tension. Under certain conditions and for certain reasons it may be desired to operate the motor 25 at greater or lesser speed to throw out the rudder quicker or slower. For this purpose, I provide a control shown diagrammatically (see Fig. 13) at 160' and may comprise a rheostat or similar regulating device.

Figure 14:
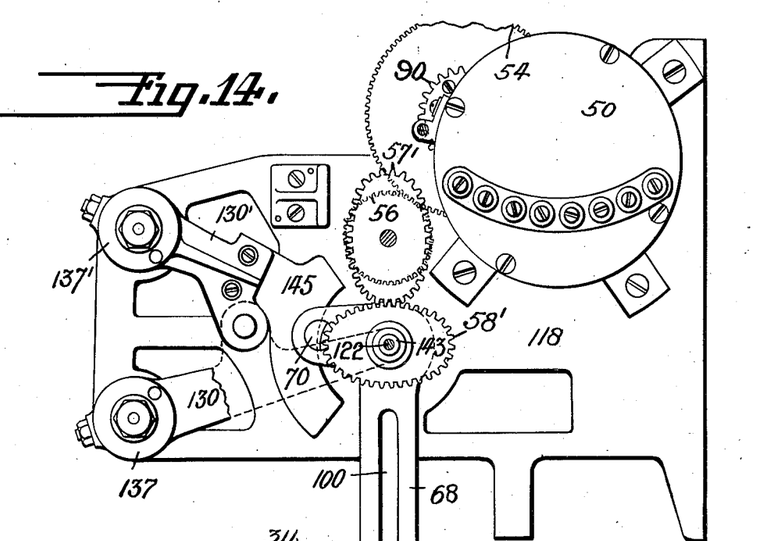
Fig. 14 is a modified form of gearing in the controller.

In actual steering of a dirigible craft it is well-known that as the deviation of the craft increases, the amount of "rudder" necessary to counteract the deviation increases in constantly diminishing ratio. Thus, for example, while a deviation of the craft of 5° may require 5° of rudder to return it to its course, a deviation of 10° may require only 8° of rudder, a deviation of 15° only 10° of rudder, and a deviation of 20° only 11° of rudder. These figures are, of course, merely illustrative. It may therefore be desirable to provide means for operating the rudder through a contantly diminishing ratio relative to the angle of deviation of the craft as said angle increases. For this purpose, I have provided the device shown in Fig. 14 wherein the trolley 44, which governs the degree of operation of the rudder, is actuated through relatively large increments for equal increments of deviation when the latter is small, and through progressively smaller increments as the deviation increases. The deviation of the ship is transmitted from the master compass to the repeater motor 50 and thence to gears 54 and 56. The latter works down to a final gear 57' of the differential which meshes with a gear 58' fixed to shaft 115 which is connected to trolley 44. Instead of being circular like gears 57 and 58, however, gears 57' and 58' are elliptical. The gears are so positioned that when the vessel is on its course, the major axis of gear 57' is in alignment with the minor axis of gear 58'. For initial movements of gear 57' there will be relatively large movements of gear 58' (since the major axis of gear 57' corresponds to a large circular gear and the minor axis of gear 58' to a small circular gear). As rotation of gear 57' continues, the ratio of said gear to gear 58' diminishes continuously, until the minor axis of 57' is in alignment with the major axis of 58' at which time the latter moves through the smallest angular distances corresponding to equal increments in angular movements of gear 57'. In other words, by means of the elliptic gears there is obtained a constantly changing gear ratio during the deviation of a craft. The ratio of gear 57' to gear 58' constantly diminishes while the angle of deviation increases, so that the greatest ratio of rudder angle to angle of deviation of the craft occurs when the deviation begins and then gradually diminishes as the deviation increases, or, stated differently, the greatest ratio occurs when the angle of deviation is small, and decreases as the angle of deviation increases.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is:

1. In a ship's steering device, the combination with the rudder, of a controller for the rudder, compass actuated means therein, and variable speed gearing in the connections between the compass means and controller for causing a relatively greater movement of the rudder by a given movement of the ship when the rudder is near its central position than when it is displaced therefrom.

2. In a steering device for dirigible craft having a rudder, a controller having relatively movable multi-parts, means responsive to movements of the craft in azimuth for imparting relative movement thereto, means responsive to movements of the rudder also for imparting relative movement thereto, and means for delaying the action of said last-named means with respect to the initial rudder movements.

3. In a steering device for dirigible craft having a rudder, a controller, means governed by said controller for operating said rudder, means including a repeater motor responsive to the turning of the craft in azimuth for actuating said controller, a manually-operable means for actuating said controller having two positions, a locking member for said first controller-actuating means normally ineffective, and means actuated when said manually-operable means is in one of said positions for rendering said locking member effective.

4. A steering device for ships having a rudder, a multi-part controller, means governed by the relative positions of said parts for operating the rudder, compass controlled means for turning a part, follow-up means from the rudder for turning a part without disturbing said first-named means, and a lost motion device between at least one of said means and its controlled part.

5. A steering device for ships having a rudder, a multi-part controller, means governed by the positions of said parts for operating the rudder, compass controlled means for turning a part, follow-up means from the rudder for turning a part without disturbing said first-named means and a time lag device between said follow-up means and its controlled part for increasing the initial throw of the rudder on change in the direction of yaw.

6. In a ship's steering device, the combination with a pilot wheel and the rudder, a follow-up system from the rudder for limiting the throw of the rudder, and variable time lag means in said follow-up system for altering the relative throw of the rudder when the direction of yaw changes.

7. In a ship's steering device, the combination with a pilot wheel and the rudder, a follow-up system from the rudder for limiting the throw of the rudder, and a lost motion connection in said follow-up system for increasing the relative throw of the rudder for the first increment of deviation of the ship.

8. In a steering device for dirigible craft having a rudder, a controller having relatively movable multi-parts, means responsive to movements of the craft in azimuth for imparting relative movement thereto, a motor governed by said controller for operating said rudder in a direction to oppose such movements, a follow-up device from said motor also for imparting relative movements to said controller including a lost-motion connection, and means for adjusting the amount of said lost-motion to vary the movement of said second part relative to said motor and rudder.

9. In a steering device for dirigible craft having a rudder, a multi-part controller, means whereby one of said parts is responsive to movements of the craft in azimuth, means governed by said controller for operating said rudder in a direction to oppose such movements, a driving connection from said last-named means to the second part of the controller, and means for varying the effective lever arm of said connection whereby the rate of movement of said second part relative to said rudder may be varied.

10. In a steering device for dirigible craft having a rudder, a multi-part controller, means whereby one of said parts is responsive to movements of the craft in azimuth, means governed by said controller for operating said rudder in a direction to oppose such movements, a driving connection from said last named means to the second part of the controller, said connection including a pin-and-slot connection for varying the effective lever arm of said driving connection to vary the rate of movement of said second part relative to said rudder.

11. In a steering device for dirigible craft, a rudder, a controller, means governed by said controller for operating said rudder, means responsive to the turning of the craft in azimuth for actuating said controller, a second means for actuating said controller, and means for locking one of the controller-actuating means when the other is operated.

12. In a steering device for dirigible craft, a rudder, a controller, means governed by said controller for operating said rudder, means responsive to the turning of the craft in azimuth for actuating said controller, a manually-operable means for actuating said controller, and means operable at will for locking said controller-actuating means.

13. In a steering device for dirigible craft, a rudder, a controller, means governed by said controller for operating said rudder, means responsive to the turning of the craft in azimuth for actuating said controller, follow-up means also for actuating said controller, manual means for actuating said controller, and manual means for locking said first-named controller-actuating means.

14. In a steering device for dirigible craft having a rudder, a controller, means governed by said controller for operating said rudder, means including a gyroscopic compass responsive to turning of the craft in azimuth for actuating said controller, and a lost-motion or delayed-action connection between said last-named means and said controller for the purpose specified.

15. In a steering device for dirigible craft having a rudder, a multi-part controller, means governed by the relative positions of said parts for operating said rudder, a gyroscopic compass responsive to the turning of the craft in azimuth for actuating one of said parts, and a lost-motion connection between said last-named means and the respective part.

16. In a steering device for dirigible craft having a rudder, a multi-part controller, means governed by the relative positions of said parts for operating said rudder, means responsive to the turning of the craft in azimuth for actuating a part, a delayed-action connection between said last-named means and said part, a follow-up means from said first-named means to a part, and a lost-motion device in said follow-up means.

17. In a steering device for dirigible craft having a rudder, a multi-part controller, means governed by the relative positions of said parts for operating said rudder, gyroscopically controlled means responsive to the turning of the craft in azimuth for actuating one of said parts, a lost-motion connection between said last-named means and the respective part, and means whereby the extent of lost-motion may be adjusted.

18. In a steering device for dirigible craft having a rudder and gyroscopic compass, a master controller, means governed thereby for operating said rudder, a repeater motor actuated from said compass for actuating said controller, and a delayed-action device between said means and controller comprising two relatively movable members one of which is movable axially to vary the extent of delayed-action.

19. In a steering device for dirigible craft having a rudder, a multi-part controller, means governed by the relative positions of said parts for operating said rudder, means responsive to the turning of the craft in azimuth for actuating one of said parts, follow-up means operable from the rudder for turning the other of said parts, a lost motion connection between one of said means and the respective part comprising two relatively movable members one of which is movable axially to vary the extent of lost-motion, and manually operable means for moving said last-named member axially, said last-named means comprising a spirally grooved cylinder, a sleeve having a projection engaging in said groove and having an arm fixed to said axially movable member.

20. In a steering device for dirigible craft having a rudder and gyroscopic compass, a controller comprising cooperating relatively rotatable contactors, means governed by said controller for operating said rudder, a repeater motor actuated from said compass for rotating one of said contactors, and a delayed-action connection between said last-named means and said contactor.

21. In a steering device for dirigible craft having a rudder, a controller comprising cooperating relatively rotatable contacts, means governed by said controller for operating said rudder, means responsive to the turning of the craft in azimuth for actuating said contacts, a delayed-action connection between said last-named means and said contacts, a follow-up means from said first-named means to said contactors, and a delayed action device in said follow-up means.

22. In a steering device for dirigible craft having a rudder, a multi-part controller, means governed by the relative positions of the parts for operating the rudder, compass-controlled mechanism for operating a part, and rudder follow-up mechanism for operating a part, the operating means of at least one of said mechanisms being rendered ineffective during part of the period of automatic operation in effecting the correction of each deviation of the craft from its course.

23. In a steering device for dirigible craft having a rudder, a multi-part controller, means governed by the relative positions of said parts for operating said rudder, means responsive to the turning of the craft in azimuth for actuating one of said parts, a follow-up means from said first named means to said other part, a lost-motion device in said follow-up means, a lost-motion device in said azimuth responsive means, and manually-operable means for each of said lost-motion devices whereby the extent of the lost motions may be adjusted, said last-named means comprising two relatively movable members, one of which is movable axially, a rotatable cylindrical member having a spiral groove, a second cylindrical member having a projection engaging in said groove, one of said members being rotatable to move the other axially, the latter member being connected to the axially movable member.

24. In an automatic steering device for dirigible craft having a rudder and a telemotor for operating said rudder, means whereby said telemotor operates said rudder through a predetermined angle corresponding to a given deviation of the craft, and means for compensating for errors in operation of said telemotor.

25. In an automatic steering device for dirigible craft having a rudder and a telemotor for operating said rudder, means whereby said telemotor operates said rudder for a predetermined time corresponding to a given deviation of the craft, and adjustable means permitting said telemotor to operate for an additional predetermined period of time to compensate for errors in operation thereof and in the rudder connections.

26. In an automatic steering device for ships, a master controller having a part controlled from the compass, manual means for altering the setting of the controller to change the course, and means for locking the compass controlled part while said manual means is being operated whereby the ship may be manually steered through said master controller without interference from the compass.

27. In an automatic steering device for ships having a telemotor control for the steering engine, of a master electrical controller, an electric motor operated therefrom for operating the steering engine through the telemotor, and an electro-mechanical brake for the motor for preventing the same, when deenergized, from being rotated by the telemotor.

28. In a steering device for dirigible craft having a rudder, means actuated by the deviation of the craft for operating said rudder, and means for varying the ratio of the change of rudder angle to the angle of deviation of the craft as the deviation increases.

29. In a steering device for dirigible craft having a rudder, means actuated by the deviation of the craft for operating said rudder, and means for continuously diminishing the ratio of the rudder angle to the deviation of the craft as the deviation increases.

30. In a steering device for dirigible craft having a rudder, a controller including a part actuated by the deviation of the craft for operating said rudder, and means for decreasing the angular movement of said part corresponding to the deviation of the craft as said deviation increases.

31. In a steering device for dirigible craft having a rudder, a multi-part controller, a direction responsive element adapted to be actuated by the deviation of the craft, and a variable gearing between said element and said part whereby the ratio of the angular movement of said part to the deviation of the craft is diminished as the deviation increases.

32. In an automatic steering device for ships, the combination with the rudder, of a controller, a follow-up connection for limiting the rudder throw, and a lost-motion means in said follow-up connection for the purpose specified.

33. In an automatic steering device for ships, the combination with the rudder, of a controller, a follow-up connection for limiting the rudder throw, a lost-motion means in said follow-up connection for the purpose specified, and means for adjusting the extent of lost-motion.

34. In a steering device for dirigible craft having a rudder, a controller, means governed by said controller for operating said rudder, means including a repeater motor responsive to the turning of the craft in azimuth for actuating said controller, a manually-operable means for actuating said controller, and means for locking said repeater motor by movement for manually-operable means.

35. In a steering device for dirigible craft having a rudder, a controller, means governed by said controller for operating said rudder, means including a repeater motor responsive to the turning of the craft in azimuth for actuating said controller, manually-operable means for actuating said controller, having two positions and a locking member for said first controller-actuating means normally ineffective and adapted to be rendered effective when said manually-operable means is in one of said positions.

In testimony whereof I have affixed my signature.

ELMER A. SPERRY, Jr.